2,962,345

FLUORINE-CONTAINING FERROMAGNETIC MATERIAL

Lothar H. Brixner, Wilmington, Del., assignor to E. I. du Pont de Nemours & Company, Wilmington, Del., a corporation of Delaware No Drawing. Filed Nov. 29, 1957, Ser. No. 699,481

4 Claims. (Cl. 23—14)

This invention relates to a new ferromagnetic material.

Ferromagnetic materials might be broadly classified into two groups: those with high coercivities and those with low coercivities. Ferromagnetic materials of the former type include permanent magnetic materials such as $BaO \cdot 6Fe_2O_3$ and manganese bismuthide (MnBi). The ferromagnetic materials of the latter class, those with low coercivities, are useful in transformers, magnetic amplifiers, memory cores, and microwave devices. This class of materials includes such well known substances as silicon irons and certain ferrites, these latter being materials having the general formula $AB_2O_4$, in which A represents a bivalent ion such as Mg, Cu, Mn, Fe or Co, or combinations of these, and B represents trivalent iron. In the compound of this invention which may be represented by the empirical formula $LiFe_2O_3F$, a bivalent oxygen ion in the formula $AB_2O_4$ is replaced by a univalent fluorine ion, and A is a univalent cation ($Li^+$), so that there is a balance between positive and negative ions.

The ferromagnetic material of this invention is prepared by presintering a finely divided mixture of lithium fluoride and ferric oxide in a 1:1 mol ratio. The presintered product thus obtained is cooled, ground to a powder, and compacted to a unitary mass of desired shape by pressing. The shaped product is then refired at a temperature above 1000° C. and very slowly cooled. It is convenient and preferred to use commercially available starting materials of the highest purity. The reaction product after the second firing step was a dark-brown, compact rod which, according to X-ray analysis, contained none of the original components, and it was found to have a cubic spinel structure with the lattice constant, $a_0$, being 8.33 A.

For a clearer understanding of the invention, the following specific examples are given. These examples are intended to be merely illustrative, however, and should not be considered as in limitation thereof.

Example I 71.668 gms. of ferric oxide and 11.645 gms. of lithium fluoride were weighed. These amounts are stoichiometric amounts according to the following equation:

$$LiF + Fe_2O_3 \rightarrow LiFe_2O_3F$$

The reactants were carefully mixed, and then placed in a platinum crucible and heated in air for two hours at 900° C. The material thus obtained was cooled to room temperature and ground in an agate ball mill to a fineness of −200 mesh. This powder was compacted into a rod ½ inch by 1 inch, by a pressure of 200,000 p.s.i. and this rod was slowly heated in oxygen to 1050° C., and then held at this temperature for three hours. After the heating, it was air quenched to room temperature.

The pycnometrically determined density of the rod was within 1% of theoretical density. The material was found to have the following magnetic properties:

| | | |
|---|---|---|
| $B_s$—Saturation magnetization | gauss | 2360 |
| $B_r$—Remanent magnetization | do | 230 |
| $\sigma_s$—Magnetic moment per gram | ergs-gauss | 51.1 |
| $iH_c$—Intrinsic coercive force | oersteds | 7.4 |
| $\rho$—Resistivity | ohm-cm | $10^5$ |
| $T_c$—Curie temperature | ° C. | 628 |

Example II

The procedure of Example I was followed, except that the ferromagnetic material was very slowly cooled after the second heating, at the rate of about 30° C. per hour.

The material thus prepared was found to have the following magnetic properties:

| | | |
|---|---|---|
| $B_s$—Saturation magnetization | gauss | 1933 |
| $B_r$—Remanent magnetization | do | 1037 |
| $\sigma_s$—Magnetic moment per gram | ergs-gauss | 56.38 |
| $iH_c$—Intrinsic coercive force | oersteds | 13.6 |
| $\rho$—Resistivity | ohm-cm | $10^5$ |
| $T_c$—Curie temperature | ° C. | 628 |

A comparison of the above data with that given in Example I shows that the remanence was greatly increased by the slower rate of cooling.

The above values for the magnetic properties were obtained using a Sanford-Bennett high-field permeameter from the Rubicon Company. The pressed rods were butted between the pole pieces of the permeameter and subjected to the standard operating procedure for obtaining the demagnetizing curve.

The high saturation magnetization value for the material of this invention, combined with its low coercive force, make it a useful ferromagnetic material for core elements, microwave switches, isolators, circulators, attenuators, gyrators, and the like.

Although the time of the first heating and the temperature of the first heating are given as 2 hours and 900° C., respectively, and the time and temperature of the second heating as 3 hours and 1050° C., respectively, these times and temperatures may vary as much as from about 1–3 hours for the first heating and from 2½ to 3½ hours for the second heating, and ±50° C. for each heating. In general, the shorter times, of course, would be used with the higher temperatures. In the preferred method of slow cooling after the last heating, a cooling rate of 5–50° C. per hour will produce a material having a high remanent magnetization.

Since it is obvious that many changes and modifications can be made in the above-described details without departing from the nature and spirit of the invention, it is to be understood that the invention is not to be limited to said details except as set forth in the appended claims.

I claim:

1. A composition of matter, the ferromagnetic material having the empirical formula $LiFe_2O_3F$.

2. A process for producing a ferromagnetic material which comprises heating at a temperature of about 850–950° C. for about 1–3 hours a powdered mixture of lithium fluoride and ferric oxide in a molecular ratio of about 1:1, cooling the product thus obtained, grinding the product to a powder, compacting the powder into a unitary mass, and heating said mass at a temperature ranging from 1000–1100° C. for from 2½ to 3½ hours, then cooling the product and recovering a ferromagnetic material.

3. The process of claim 2 in which the final cooling is conducted at the rate of 5–50° C. per hour.

4. A process for producing a ferromagnetic material which comprises heating at a temperature of about 900° C. for about 2 hours a powdered mixture of lithium fluoride and ferric oxide in a molecular ratio of about 1:1, cooling the product thus obtained, grinding the product to a powder, compacting the powder into a unitary mass, and heating said mass at a temperature ranging from about 1050° C. for about 3 hours, then cooling the product and recovering a ferromagnetic material.

References Cited in the file of this patent

UNITED STATES PATENTS

| | | |
|---|---|---|
| 2,549,089 | Hegyi | Apr. 17, 1951 |
| 2,736,708 | Crowley et al. | Feb. 28, 1956 |
| 2,751,353 | Gorter | June 19, 1956 |
| 2,893,830 | Brixner | July 7, 1959 |

FOREIGN PATENTS

| | | |
|---|---|---|
| 514,251 | Canada | June 28, 1955 |
| 697,219 | Great Britain | Sept. 16, 1953 |

OTHER REFERENCES

Harvey et al., RCA Reviews, September 1950, pp. 344–346.

Weisz, Ceramic Ind. vol. 58, No. 4, p. 130, April 1952.

A Comprehensive Treatise on Inorganic Chemistry by Mellor, vol. 3, p. 694, pub. by Longman's Green, London (1923).